United States Patent
Thienel et al.

(10) Patent No.: US 10,807,299 B2
(45) Date of Patent: Oct. 20, 2020

(54) METHOD FOR PRODUCING A STRUCTURAL COMPONENT FOR MOTOR VEHICLES FROM AN ORGANO-SHEET

(71) Applicant: Brose Fahrzeugteile GmbH & Co. KG, Hallstadt, Hallstadt (DE)

(72) Inventors: Michael Thienel, Thurnau (DE); Olaf Kriese, Coburg (DE); Markus Schultz, Nuremberg (DE); Werner Stammberger, Grub am Forst (DE); Stephan Nerb, Zeil am Main (DE)

(73) Assignee: Brose Fahrzeugteile GmbH & Co. Kommanditgesellschaft, Hallstadt, Hallstadt (DE)

( * ) Notice: Subject to any disclaimer, the term of this patent is extended or adjusted under 35 U.S.C. 154(b) by 350 days.

(21) Appl. No.: 14/904,322

(22) PCT Filed: Jul. 11, 2014

(86) PCT No.: PCT/EP2014/064933
§ 371 (c)(1),
(2) Date: Jan. 11, 2016

(87) PCT Pub. No.: WO2015/004271
PCT Pub. Date: Jan. 15, 2015

(65) Prior Publication Data
US 2016/0136870 A1 May 19, 2016

(30) Foreign Application Priority Data

Jul. 12, 2013 (DE) .................. 10 2013 213 711

(51) Int. Cl.
*B29C 51/12* (2006.01)
*B60J 5/04* (2006.01)
(Continued)

(52) U.S. Cl.
CPC ........ *B29C 51/12* (2013.01); *B29C 45/14221* (2013.01); *B29C 45/14786* (2013.01);
(Continued)

(58) Field of Classification Search
CPC . B29C 51/12; B29C 51/145; B29C 45/14221; B29C 45/14786;
(Continued)

(56) References Cited

U.S. PATENT DOCUMENTS 6,265,037 B1 * 7/2001 Godavarti ........... B29C 47/0004
428/297.4
8,101,262 B2 † 1/2012 Yamanouchi
(Continued)

FOREIGN PATENT DOCUMENTS

CN 101031420 A 9/2007
CN 102991046 A 3/2013
(Continued)

OTHER PUBLICATIONS

Machine translation of JP 201102013 A; published in year 2011.*
(Continued)

*Primary Examiner* — Vishal I Patel
(74) *Attorney, Agent, or Firm* — Lewis Roca Rothgerber Christie LLP

(57) ABSTRACT

In a method for manufacturing a structural component for motor vehicles by hot forming of a plate-shaped semi-finished product reinforced of thermoplastic material with embedded continuous fibers ("organo-sheet") regions of the organo-sheet (2) provided for accommodating the organo-sheet (2) in a hot forming device (1) and/or portions (21, 22) of the structural component (5) manufactured from the organo-sheet (2), which are exposed to an increased load, are structured more strongly and/or are subjected to a particular thermal treatment during hot forming.

9 Claims, 19 Drawing Sheets

(51) Int. Cl.

| | | |
|---|---|---|
| *B29C 45/14* | (2006.01) | |
| *B29C 51/14* | (2006.01) | |
| *B29L 31/30* | (2006.01) | |
| *B29K 105/06* | (2006.01) | |
| *B29K 105/08* | (2006.01) | |
| *B29K 77/00* | (2006.01) | |
| *B29K 105/00* | (2006.01) | |

(52) U.S. Cl.
CPC ........... *B29C 51/145* (2013.01); *B60J 5/0416* (2013.01); *B29C 2045/14237* (2013.01); *B29K 2077/00* (2013.01); *B29K 2105/06* (2013.01); *B29K 2105/08* (2013.01); *B29K 2105/0872* (2013.01); *B29K 2105/256* (2013.01); *B29L 2031/3014* (2013.01)

(58) Field of Classification Search
CPC ...... B29C 2045/14237; B29K 2077/00; B29K 2105/08; B29K 2105/256; B29K 2105/06; B29K 2105/0872; B29L 2031/3014; B60J 5/0416
See application file for complete search history.

(56) References Cited

U.S. PATENT DOCUMENTS

| | | | |
|---|---|---|---|
| 2003/0011178 A1 | 1/2003 | Choi et al. | |
| 2003/0175455 A1 | 9/2003 | Erb et al. | |
| 2007/0202314 A1 | 8/2007 | Youn et al. | |
| 2007/0222257 A1† | 9/2007 | Flendrig et al. | |
| 2008/0233342 A1* | 9/2008 | Birrell | B29C 70/46 428/114 |
| 2011/0020572 A1† | 1/2011 | Malek et al. | |
| 2011/0254311 A1† | 10/2011 | Dajek et al. | |
| 2012/0222809 A1† | 9/2012 | Scherzer et al. | |
| 2014/0210233 A1* | 7/2014 | Brymerski | B60J 5/0415 296/191 |

FOREIGN PATENT DOCUMENTS

| | | |
|---|---|---|
| DE | 20 2006 019 341 U1 | 4/2007 |
| DE | 10 2010 001 634 A1 | 8/2011 |
| DE | 102010001634 A1 † | 8/2011 |
| DE | 102010053381 A1 | 6/2012 |
| DE | 102011077834 A1 | 12/2012 |
| DE | 10 2011 111 232 A1 | 2/2013 |
| DE | 102011111232 A1 † | 2/2013 |
| DE | 102011118980 A1 † | 5/2013 |
| EP | 2 371 515 B1 | 7/2015 |
| JP | 0531811 A | 2/1993 |
| JP | 0531812 A | 2/1993 |
| JP | 05147169 A | 6/1993 |
| JP | 2003-291232 A | 10/2003 |
| JP | 2007-069832 A | 3/2007 |
| JP | 2008-506562 | 3/2008 |
| JP | 2008-540168 | 11/2008 |
| JP | 2011-102013 | 5/2011 |
| KR | 1020030047323 A | 6/2003 |
| KR | 1020060045872 A | 5/2006 |
| WO | WO 2006/008529 A1 | 1/2006 |
| WO | WO 2006/119002 A2 | 11/2006 |
| WO | WO 2011/095399 A1 | 8/2011 |
| WO | WO 2013/000533 A1 | 1/2013 |
| WO | WO 2013/053487 A2 | 4/2013 |
| WO | WO 2014/044648 A2 | 3/2014 |

OTHER PUBLICATIONS

Bürkle, Das Zeitalter der Verfahrens-kombination beginnt, Kunststoffe Oct. 2012, p. 44-52, Carl Hanser Verlag, München, including English summary.
Brandt et al., Integrative Simulation von Organoblech-Hybridbauteilen, Kunststoffe Sep. 2012, p. 102-106, Carl Hanser Verlag, München, including English summary.
Drummer et al., Hohlkörperverbundstrukturen im Minutentakt, Kunststoffe Mar. 2011, p. 110-114, Carl Hanser Verlag, München, including English summary.
Selig et al., Mehr Potenzial für Leichtbau, Kunststoffe Mar. 2012, p. 68-70, Carl Hanser Verlag, München, including English summary.
Becker et al., Maßgeschneiderte Thermoplaste mit Layerstrukturen and Endlosfaser-Verstärkung, Kunststoffe Sep. 2003, p. 44-47, Carl Hanser Verlag, München, and English summary (1 page).
Geiger et al., Maßgeschneidert leicht, Kunststoffe Dec. 2003, p. 40-44, Carl Hanser Verlag, München, and English summary (1 page).
European Search Report for corresponding EP Application No. 16150277.8-1706 dated Jun. 21, 2016, 6 pages.
Korean Office action dated May 27, 2016 issued in corresponding KR Application No. 10-2015-7037280, with English translation, 16 pages.
Chinese First Office action dated Aug. 18, 2016 issued in corresponding Chinese Application No. 201480039863.8, 7 pages, with English translation, 6 pages.
Japanese Office action dated Jan. 17, 2017 issued in corresponding Japanese Application No. 2016-044582, 4 pages, with English translation, 5 pages.
Japanese Office action dated Jan. 17, 2017 issued in corresponding Japanese Application No. 2016-524840, 5 pages, with English translation, 6 pages.
JP Office action dated Aug. 22, 2017 issued in corresponding Japanese Application No. 2016-524840, 5 pages, with English translation, 4 pages.
JP Office action dated Aug. 22, 2017 issued in corresponding Japanese Application No. 2016-044582, 4 pages, with English translation, 3 pages.
European Examination Report dated Nov. 6, 2018, 3 pages.
Third Chinese Office action dated Jan. 4, 2019 issued in corresponding Chinese Application No. 2016100860223, 16 pages, with English translation, 4 pages.
Du, et al., Introduction to Materials Science and Engineering, vol. 1, Univ. Press, Univ. of Electrical Engineering and Electronics Xi'an, 2013, pp. 193-194, No English Abstract available, for relevance please see Translation of Chinese Office action.
Zhang, et al., Engineering Materials, vol. 4, Southeast Univ. Press, Nanjing, China, 2013. p. 308, No English Abstract available, for relevance please see Translation of Chinese Office action.
Hu, et al. Developed Composite Material, vol. 2, Univ. Press, Univ. of National Defense, 2011, pp. 139-141, No English Abstract available, for relevance please see Translation of Chinese Office action.
English translation of the European Examination Report dated Jun. 11, 2019 submitted previously on Jul. 24, 2019.
European Examination Report dated Jun. 11, 2019 issued in EP Application No. 14 750 322.1-1014, 4 pages.
"The Age of Combined Processes is Dawning" by Erwin Burkle, published in Kunststoffe International, Oct. 2012 by Carl Hanser Verlag, Munich, Germany, pp. 24-30, Translated from Kunststoffe Oct. 2012, pp. 44-52, Document No. PE111181.†
"Integrative Simulation of Hybrid Composite Parts" by Marcel Brandt et al., Published in Kunststoffe International, Sep. 2012, by Carl Hanser Verlag, Munich, Germany, pp. 51-54, Translated from Kunststoffe Sep. 2012, pp. 102-106, Document No. PE111138.†

\* cited by examiner
† cited by third party

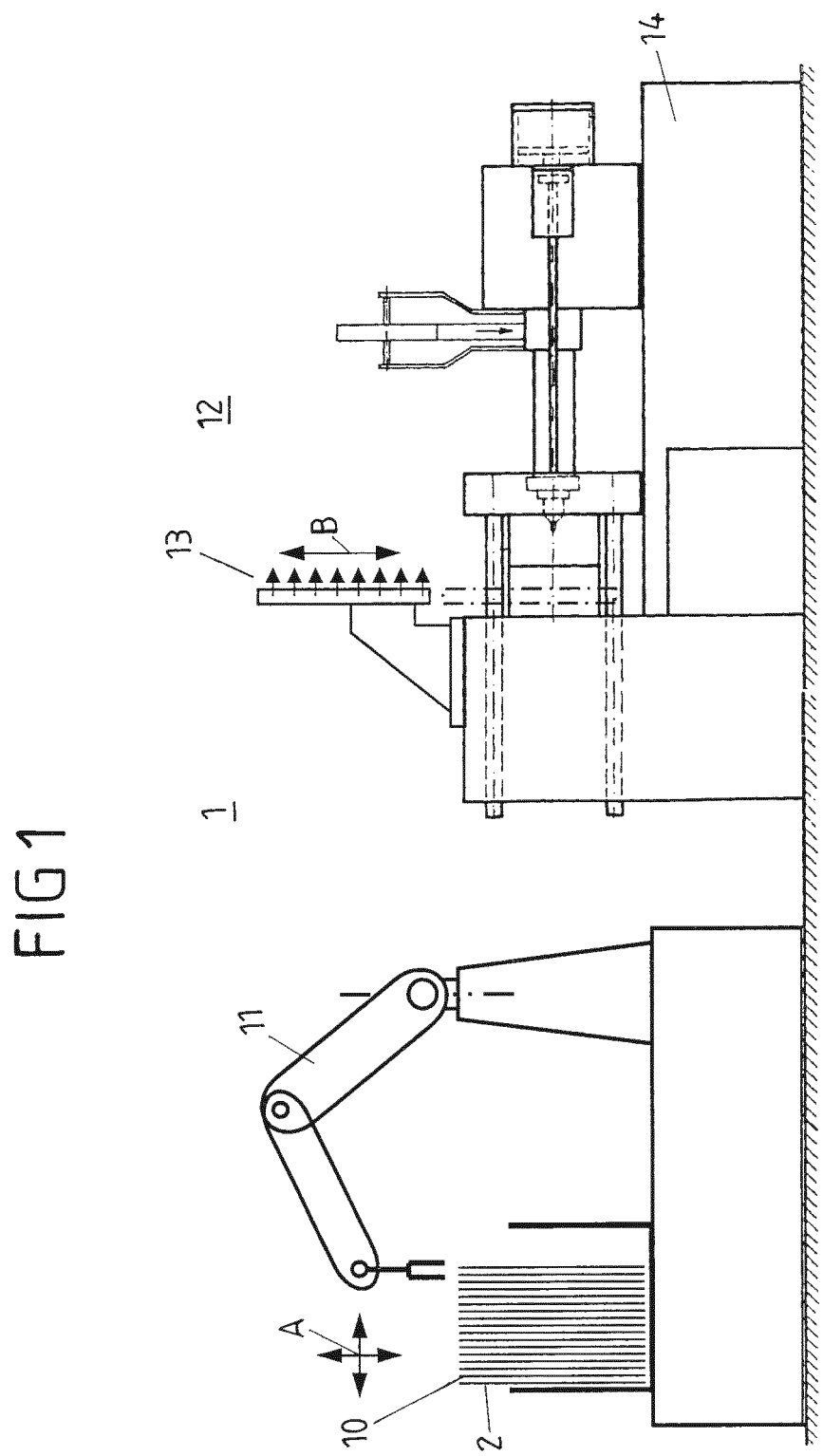

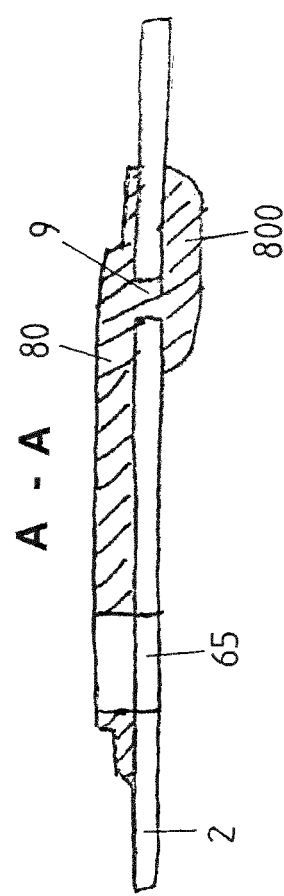
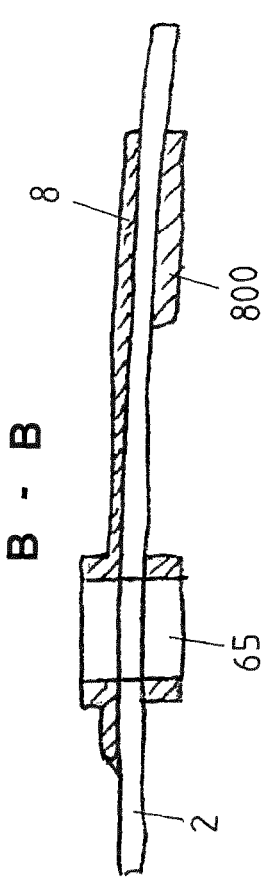
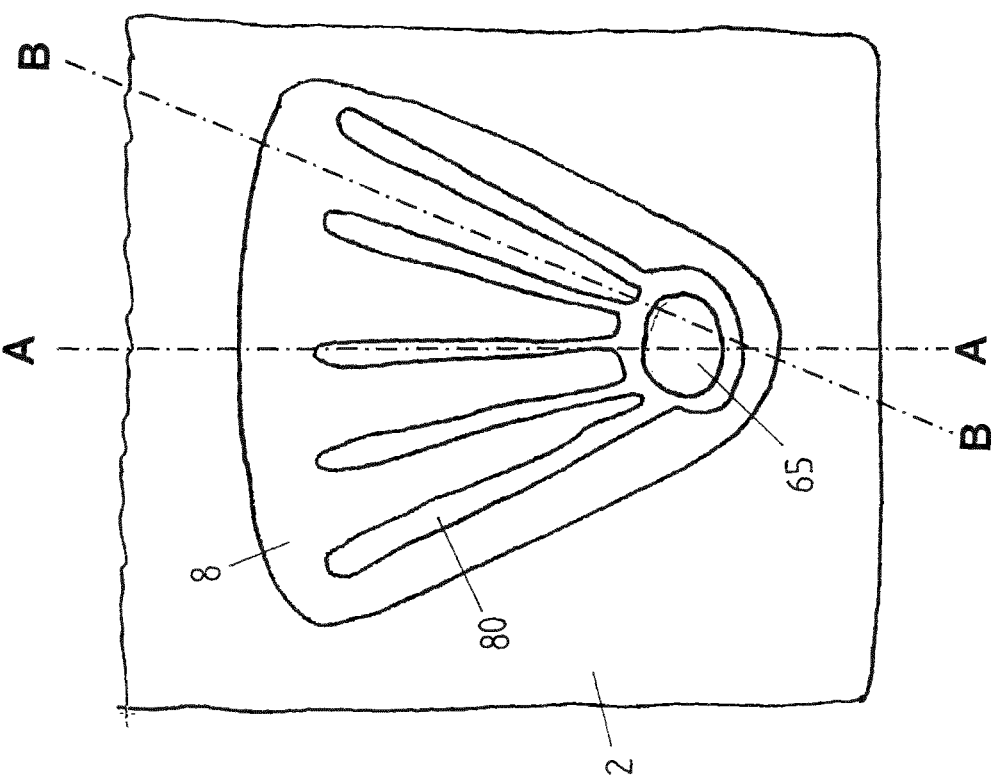

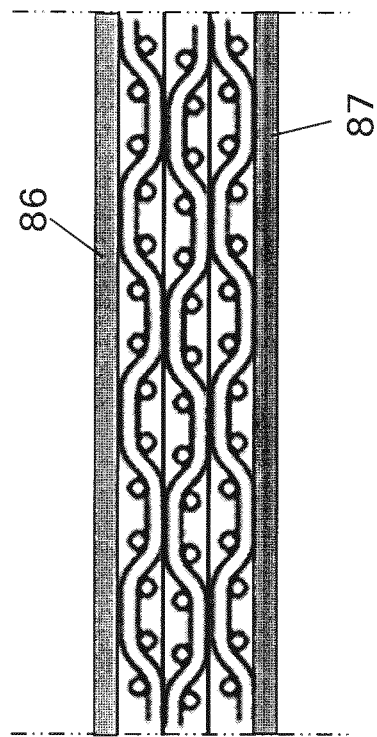
FIG 27
FIG 28
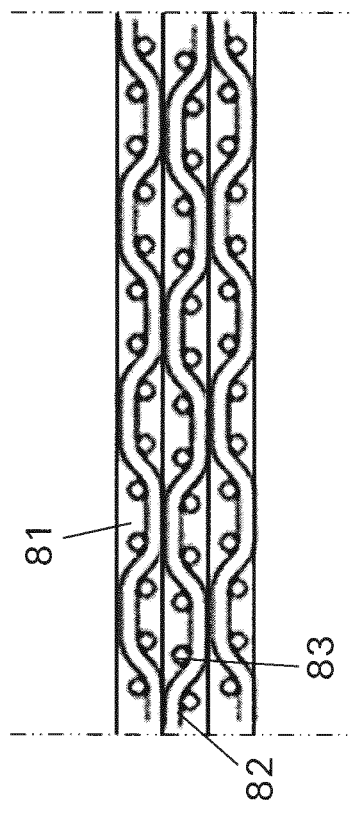
FIG 25
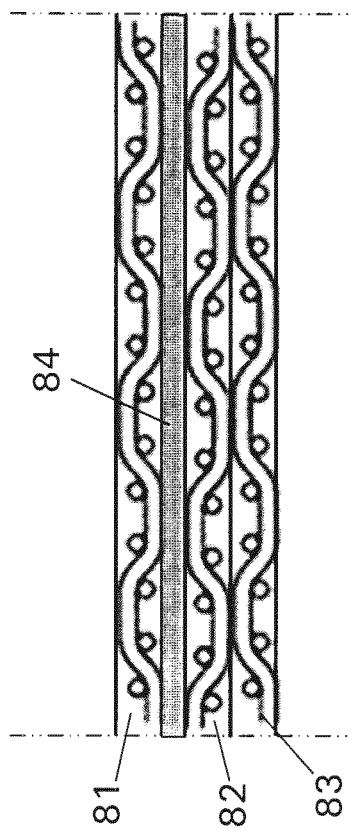
FIG 26

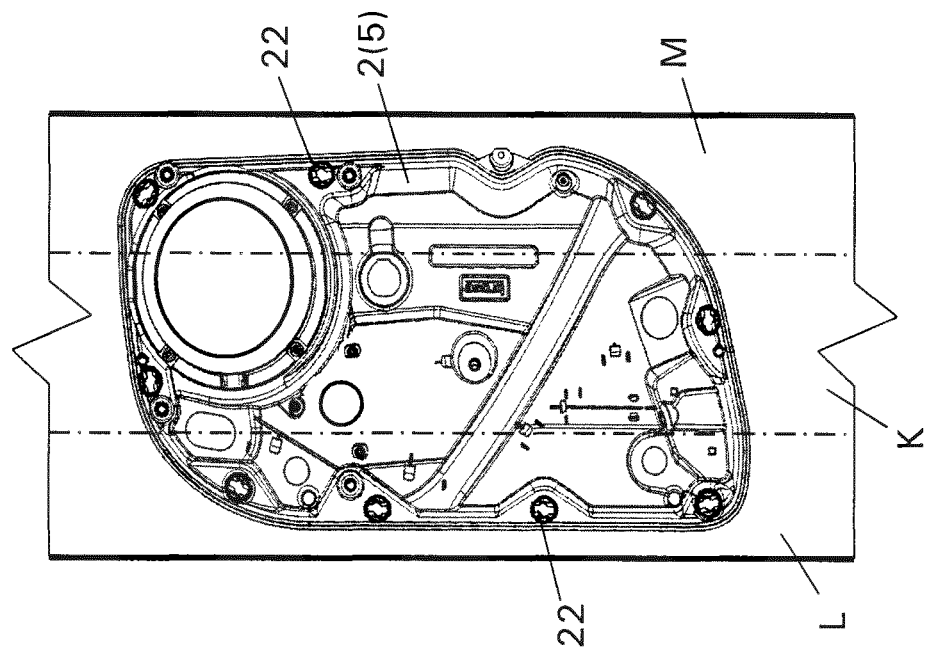
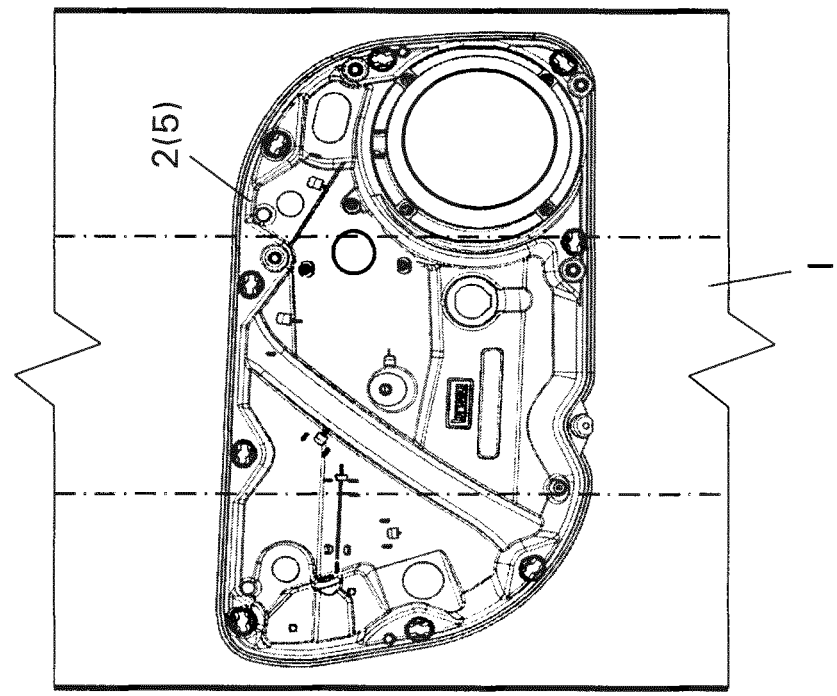

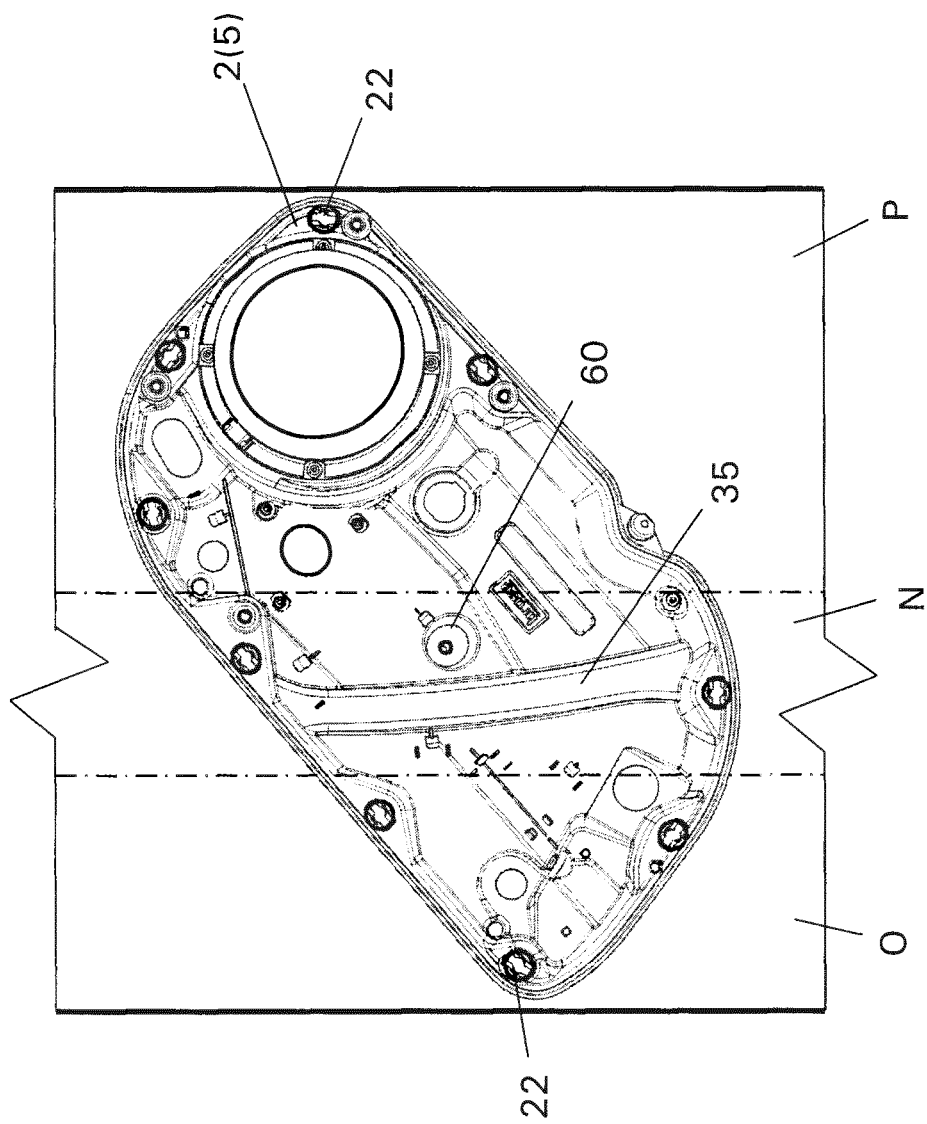

METHOD FOR PRODUCING A STRUCTURAL COMPONENT FOR MOTOR VEHICLES FROM AN ORGANO-SHEET

CROSS-REFERENCED TO RELATED APPLICATION(S)

This Application is a National Phase Patent Application of, and claims priority to and the benefit of International Application Number PCT/EP2014/064933, filed on Jul. 11, 2014, which claims priority to and the benefit of German Application Number 10 2013 213 711.7, filed Jul. 12, 2013, the entire contents of all of which are incorporated herein by reference.

The invention relates to a method for manufacturing a structural component for motor vehicles according to the generic part of claim 1, an organo-sheet for manufacturing a structural component formed in particular as door inner skin, door module or assembly carrier of a motor vehicle door according to claims 20 to 25, and a structural component made of at least one organo-sheet according to claims 26 to 31.

Organo-sheets are understood to be plate-shaped semi-finished products of a continuous fiber-reinforced thermoplastic material, in which continuous fibers in the form of layings, woven fabrics or knit fabrics made of glass, Kevlar, carbon or plastic fibers are embedded into a thermoplastic matrix. As thermoplastic material for the matrix, polyamide for example is useful due to its good properties of adhesion to the fibers.

The term "continuous fiber-reinforced" refers to the fact that the length of the fibers serving for reinforcement substantially is limited by the size of the plate-shaped organo-sheets, but within an organo-sheet a fiber substantially is not interrupted.

Organo-sheets can be cut to size like metal sheets and be provided with apertures, but are lighter than metal sheets and at the same time have a high surface stiffness and strength. With sufficient heating of the thermoplastic matrix, organo-sheets can be deformed three-dimensionally like metal sheets, but by applying smaller deformation forces. For this purpose, the organo-sheet first of all is heated, in order to melt the matrix of the organo-sheet, and subsequently the organo-sheet is formed by deep-drawing. Structural components for motor vehicles, for example door elements such as door modules, assembly carriers, door inner panels and door outer panels, seat elements such as seat pan and backrest, but also fenders, flaps and hoods, bumpers and the like thereby can be manufactured in a lightweight construction, and distinct weight reductions thereby can be achieved with easier processing at the same time.

From DE 10 2010 001 634 A1 there is known a method for manufacturing a component from an organo-sheet by thermal forming of the organo-sheet, in which for the formation of cutouts in the component the fiber arrangement of the organo-sheet is expanded without destroying the structure of the fiber arrangement of the organo-sheet embedded into the matrix of thermoplastic material From DE 10 2011 111 232 A1 there is known a light-weight component serving as body pillar reinforcement for a motor vehicle, in which several organo-sheet layers with fiber reinforcements of different orientation as well as apertures and through holes are provided, which in the size, shape and position of the light-weight component are adapted to its intended use.

From DE 20 2006 019 341 U1 there is known a structural component of organo-sheet with plastic inserts serving for structural reinforcement and formed as molded parts, which for the cohesive connection is overmolded with thermoplastic reinforcing material.

It is the object of the present invention to indicate a method as mentioned above, which minimizes the load of the organo-sheet during a hot forming process for manufacturing a structural component and the structural load of the structural component manufactured from the organo-sheet and maintains the stability of the organo-sheet and the structural component manufactured from the organo-sheet by taking account of structural changes of the organo-sheet during hot forming.

According to the invention, this object is solved by a method with the features of claim 1. The solution according to the invention to more strongly structure regions of the organo-sheet provided to accommodate the organo-sheet in a hot forming device and/or portions of the structural component manufactured from the organo-sheet, which are exposed to an increased load, and/or to subject the same to a particular thermal treatment during hot forming, minimizes the load of an organo-sheet during the hot forming process, increases the structural loadability of the structural component manufactured from the organo-sheet and maintains the stability of the organo-sheet and the structural component manufactured from the organo-sheet by taking account of structural changes of the organo-sheet during hot forming.

To minimize the load of an organo-sheet during the hot forming process and the structural load of the structural component manufactured from the organo-sheet, a thermal protection of the suspension points of the organo-sheet is provided in the tool for manufacturing the structural component in that the regions of the organo-sheet provided for accommodating the organo-sheet in a hot forming device are heated less than adjacent regions of the organo-sheet during hot forming of the organo-sheet. In particular, during heating of the organo-sheet by means of an infrared radiator or radiant heater, the regions of the organo-sheet provided for accommodating the organo-sheet in the hot forming device are shaded with respect to the infrared radiator or radiant heater or the intensity of the thermal radiation is reduced in the vicinity of the regions provided for accommodating the organo-sheet in the hot forming device.

To more strongly structure the regions provided for accommodating the organo-sheet in a hot forming device or the portions of the structural component manufactured from the organo-sheet, which are exposed to an increased load, additional mounting points are provided in the organo-sheet, which are closed after hot forming of the organo-sheet, in particular are closed by injecting thermoplastic material, and/or the edge of the organo-sheet in the region of mounting points is expanded beyond the edge to form protrusions and/or defined weakened regions formed as slots or material thinning in the organo-sheet are associated to the mounting points as yielding, sliding or deformation regions which after hot forming of the organo-sheet are reinforced with a plastic material or closed, so that during the spatial molding process the material is provided with a freedom of movement also at possibly selected mounting points.

Alternatively or in addition, in the regions of increased load of the structural component reinforcing elements such as ties can be integrated into the organo-sheet or the structural component or be put onto the structural component, wherein a reinforcing element preferably made of an organo-sheet is welded, glued or riveted to the structural component.

In addition, adapters for the connection of the reinforcing element with the organo-sheet and for force introduction into the structural component as well as for force distribution in the structural component can be injection-molded, glued, crimped or riveted to the reinforcing element, so that a corresponding connection between the adapter and the reinforcing element, which also can be a reinforcement region in the organo-sheet, is made for example by injection molding, gluing or riveting, wherein the adapters and the reinforcing element are inserted into a molding die for manufacturing the structural component and/or are arranged in the edge region of the organo-sheet, and in the region of the arrangement of the adapters the edge is provided with a protrusion which is folded over and thermally welded to the adapters.

In a preferred embodiment, adapters can be injection-molded to the organo-sheet in one piece and include paths of force with which a cohesive connection to the reinforcing element is produced. Proceeding from a mounting opening, the adapters are expanded in direction of the connecting region of the reinforcing element, preferably in a finger-shaped fan-out, in particular by forming a correspondingly directed rib structure.

In a further embodiment, on the side of the organo-sheet opposite the injection molding side of the adapter a through-molding cavity is provided in the molding die, which only by through-molding of the reinforcing element or organo-sheet in the region of the reinforcing element can be filled with the material of the plastic matrix, so that the degree of filling can be used as quality feature for the connection to be produced.

In a further aspect of the method according to the invention, a connecting region of the reinforcing element can be put into an aperture of the structural component and be connected with the structural component by inserting a stabilizing element.

To increase the structural loadability of the structural component manufactured from the organo-sheet and to maintain the stability of the organo-sheet and the structural component manufactured from the organo-sheet by taking account of structural changes of the organo-sheet during hot forming, the continuous fibers embedded in the thermoplastic material are arranged in a load-oriented manner and/or at least two intersecting continuous fiber layers are provided and are fixed, in particular sewn together in the intersection regions and/or before being embedded in the thermoplastic material, the continuous fibers or continuous fiber layers are positioned in angular positions corresponding to the loading directions, in order to achieve an optimum orientation, and/or several layers of thermoplastic material with and without embedded continuous fibers are integrated into the organo-sheet and/or outer layers of the organo-sheet of thermoplastic material reinforced with carbon fibers are connected with an intermediate layer of aramide, wherein the intermediate layer of aramide preferably is mixed with natural fibers, in particular of wood or sisal.

In particular, before being embedded into the plastic matrix, the intersecting continuous fibers of a structural component are aligned corresponding to at least one pre-dominant loading direction, for example along the pull-off direction of a window pane parallel to a guide rail of a window lifter.

An organo-sheet which is subjected to a hot forming process for manufacturing a structural component by the method according to the invention in a first embodiment has a multilayer structure with a sealing layer arranged on at least one outer side and/or at least one sealing layer arranged between two layers, wherein the sealing layer consists of a film, a fleece or a sealing protective paint. The organo-sheet is combined with at least one sealing layer, in order to prevent during the molding process, i.e. the formation of a comparatively strong spatial structure, that holes are formed and the structure becomes untight.

An organo-sheet for a structural component formed as door module or assembly carrier of a motor vehicle door preferably includes continuous fibers or continuous fiber layers embedded in thermoplastic material, which are aligned in loading direction of a functional element of the motor vehicle door mounted on the door module, wherein in particular the continuous fibers or continuous fiber layers are aligned in pull-off direction of a window pane of a window lifter, in particular parallel to the guide rails of the window lifter, and/or the continuous fibers or continuous fiber layers are aligned in direction of the pull connection between a door lock and a door hinge of the motor vehicle door, and/or the continuous fibers or continuous fiber layers are aligned in loading direction of a door closing handle.

The semi-finished product of the organo-sheet, which is the basis of the structural door component, thus consists of at least two regions which have a sandwich-like structure and differ in their mechanical properties.

In a further embodiment, an organo-sheet for manufacturing a structural component formed as door module or assembly carrier of a motor vehicle door can include apertures arranged in the edge region of the organo-sheet or integrally molded fastening elements for connecting the door module with a door inner panel of the motor vehicle door, wherein the apertures for accommodating fastening elements for a bayonet connection are formed between the organo-sheet and the door inner panel and the fastening elements are integrally molded to the edge of the apertures, forming a predetermined breaking region.

A structural component manufactured with at least one organo-sheet as mentioned above has a sandwich-like structure with outer organo-sheets and a core region adapted to the respective requirements of the structural component and/or several zones of the planiform structural component adapted to the respective requirements.

Advantageous aspects of such structural component are characterized by several zones of the planiform structural component adapted to the respective requirements with a multi-layer, sandwich-like structure with
different core material and/or
different core thicknesses and/or
different number of various zones of the planiform structural component,
thermally or acoustically well insulating zones with low pressure stability in connection with zones of high compressive strength,
at least one zone with high moment of resistance,
a zone of high tensile strength and several zones of high pressure load bearing capability.

Further features and advantages of the invention to be achieved therewith will be illustrated by means of the following description of exemplary embodiments with reference to the Figures of the drawing. This description and the Figures also disclose features of the exemplary embodiments which are not contained in the claims. These features also can occur in combinations other than those specifically disclosed here. The fact that several of such features are mentioned in one and the same sentence or in another kind of context does not mean that they only can occur in the specifically disclosed combination; instead, it must be assumed in principle that individual features of a plurality of such features also can be omitted or modified, unless this does not question the operability of the invention. In the drawing:

FIG. 1 shows a schematic representation of a plant for hot forming organo-sheets and for manufacturing structural components in particular for motor vehicle parts;

FIG. 13 shows a top view of an organo-sheet with a mounting opening and an adapter fanned out in a finger-shaped manner in direction of the connecting region of a reinforcing element;

FIGS. 14 and 15 show sections through the organo-sheet according to FIG. 13 along the sectional lines A-A and B-B;

FIGS. 25 to 28 show cross-sections through an organo-sheet with a layer structure with additional film layers for securing the tightness of the organo-sheet;

FIGS. 37 to 39 show top views of a structural component formed as door module with different load zones of the organo-sheet for manufacturing the structural component.

Figure 3:
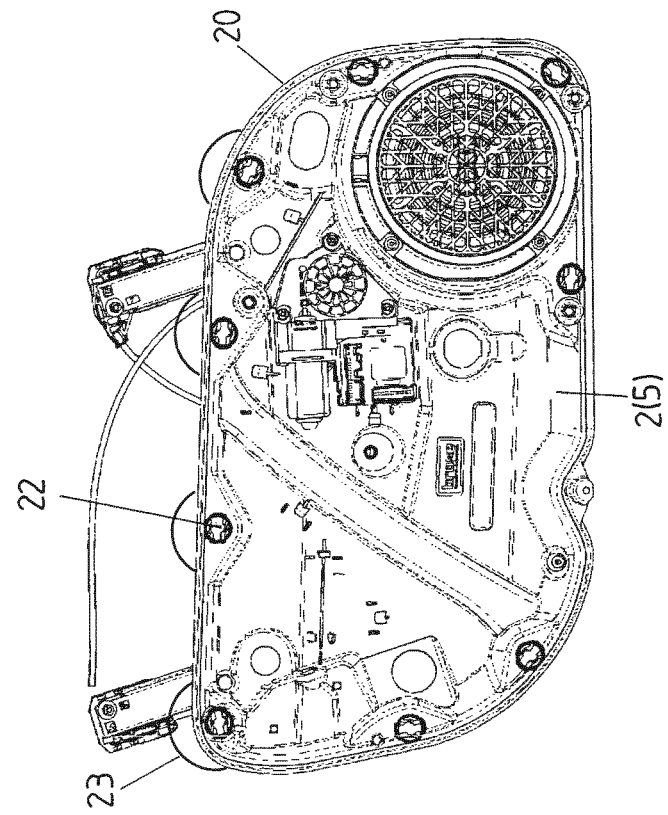
FIG. 3 shows a top view of a structural component formed as door module or assembly carrier of a motor vehicle door with protrusions of the organo-sheet formed at the suspension points.

The plant 1 for hot forming organo-sheets 2 for manufacturing structural components for motor vehicles, which is schematically shown in FIG. 1, contains a magazine 10 with plate-shaped or tabular organo-sheets 2 stacked therein, whose outer contours are adapted to the structural components manufactured from the organo-sheets 2 for a motor vehicle. A robot with a gripper 11 arranged adjacent to the magazine 10 is movable in direction of the intersecting arrows A. i.e. vertically to the plane of the organo-sheets 2 and in the plane of the organo-sheets 2, in order to transport the organo-sheets 2 from the magazine 10 to a processing unit 12 with a radiator unit 13 shiftable in direction of the double arrow B and with an injection molding machine 14 for hot forming and for integrally molding additional parts or for injection into openings or apertures provided for the processing operation. The organo-sheets 2 made of a plastic matrix with embedded continuous fibers in the form of layings, woven fabrics or knit fabrics, which are delivered as semi-finished product, are processed in the plant 1 schematically shown in FIG. 1 by hot forming and possibly by injection molding of parts or by closing openings or apertures by injection, wherein the organo-sheets 2 in the state as delivered already are tailored to the later intended use, i.e. are adapted in their outer contour to the later intended use as structural components for motor vehicles such as door elements, module carriers, door inner panels and door outer panels, seat elements such as seat pan and backrest, but also fenders, flaps and hoods, bumpers and the like.

For hot forming and treatment in the injection molding machine 14, the organo-sheets 2 are removed from the magazine 10 by means of the robot with gripper 11 and transported to a suspension of the processing unit 12. For this purpose, the shiftable radiator unit 13 can be lifted or lowered with respect to the double arrow B, before the radiator unit 13 is activated for heating the organo-sheet 2.

Figure 2:
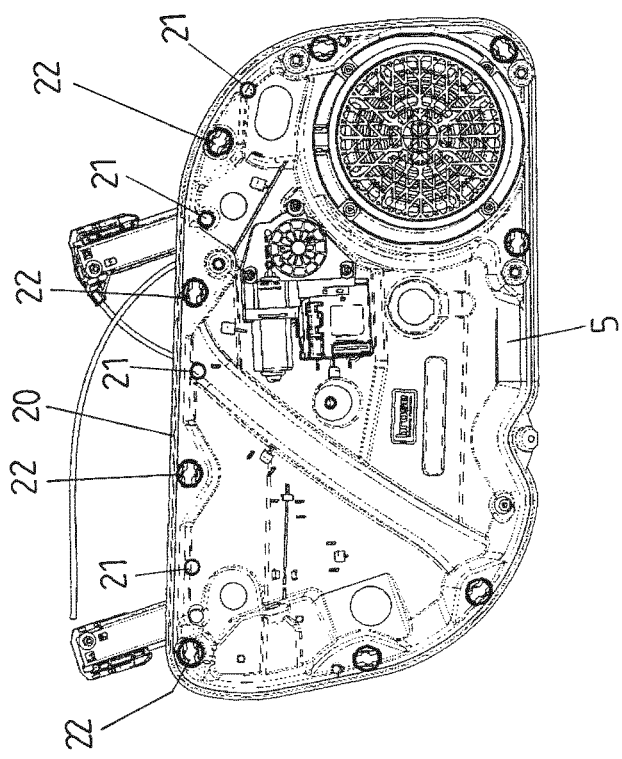
FIG. 2 shows a top view of a structural component formed as door module or assembly carrier of a motor vehicle door with suspension points for hot forming of an organo-sheet and interfaces for a bayonet connection of the structural component.

FIG. 2 shows a top view of a structural component of a motor vehicle in the form of a door module or an assembly carrier 5 of a motor vehicle door with several interfaces or through openings 22 arranged distributed around the circumference of the door module or assembly carrier 5 for a bayonet connection of the door module or assembly carrier 5 with a door inner panel of the motor vehicle door. These interfaces or through openings 22 for the bayonet connection at the same time can be arranged and formed such that they serve as suspension points for accommodating the organo-sheet formed to the structural component 5 on needles. For this purpose, measures to avoid tearing out of the through openings 22 during hot forming of the organo-sheet 2 by isolation, partially reduced radiator intensity in the region of the through openings 22 and cooling in the suspension region by cold air supplied by means of a blower can be taken in the region of the through openings 22.

In addition to the arrangement of through openings 22 for a bayonet connection of the door module 5 with a door inner panel of a motor vehicle door, fastening elements with an actuating head actuatable by means of a tool, a shank which reaches through the through opening 22 of the door module 5 formed as bayonet connection and a mounting point of the door inner panel aligned therewith, and a fastening head in the region of the actuating head can integrally be formed, in particular be injection-molded to the edge of the door module 5. The connecting region, along which the fastening elements at their fastening heads are integrally connected with the door module 5 at the edge of the through openings 22, is formed as predetermined breaking region, i.e. upon actuation of the fastening elements at their actuating heads by means of an associated tool the fastening elements initially are shifted in axial direction, wherein the connection between the fastening elements and the door module is broken. During further axial shifting of the fastening elements, the shanks reach through the through openings 22 as well as the mounting points of the door inner panel, until their fastening heads are located beyond the mounting points of the door inner panel.

After the fastening elements have been shifted in axial direction such that their fastening heads no longer lie within the through openings 22 of the door module 5, but now rather protrude from the door-structure-side surface of the door module 5 and thereby are located beyond the mounting points of the door inner panel, the fastening elements are rotated by 180° to produce the bayonet lock.

Alternatively or in addition, further suspension points 21 formed as perforations can be provided between the through openings 22 for the bayonet connections in the upper suspension region, which either serve as further mounting points for screw connections or are closed by means of the injection molding machine 14 according to FIG. 1 after hot forming of the organo-sheet.

In a top view of a structural component 5 formed as door module or assembly carrier. FIG. 3 shows a further alternative to avoid an extraction of the organo-sheet 2 at these suspension points during hot forming of the organo-sheet 2, which consists in providing protrusions 23 at the contour 20 of the organo-sheet 2 or structural component 5, which during hot forming of the organo-sheet 2 are not heated due to a corresponding positioning of the radiator unit 13 according to FIG. 1, so that a stiff material extension is created in the region of the suspension points in the manner of a bridge construction which transmits the forces acting on the suspension points during hot forming of the organo-sheet to the sides of the suspension points. During a later configuration of the door module or assembly carrier 5, the protrusions 23 can be maintained or be cut away before the further processing and installation into a motor vehicle door.

Figure 4:
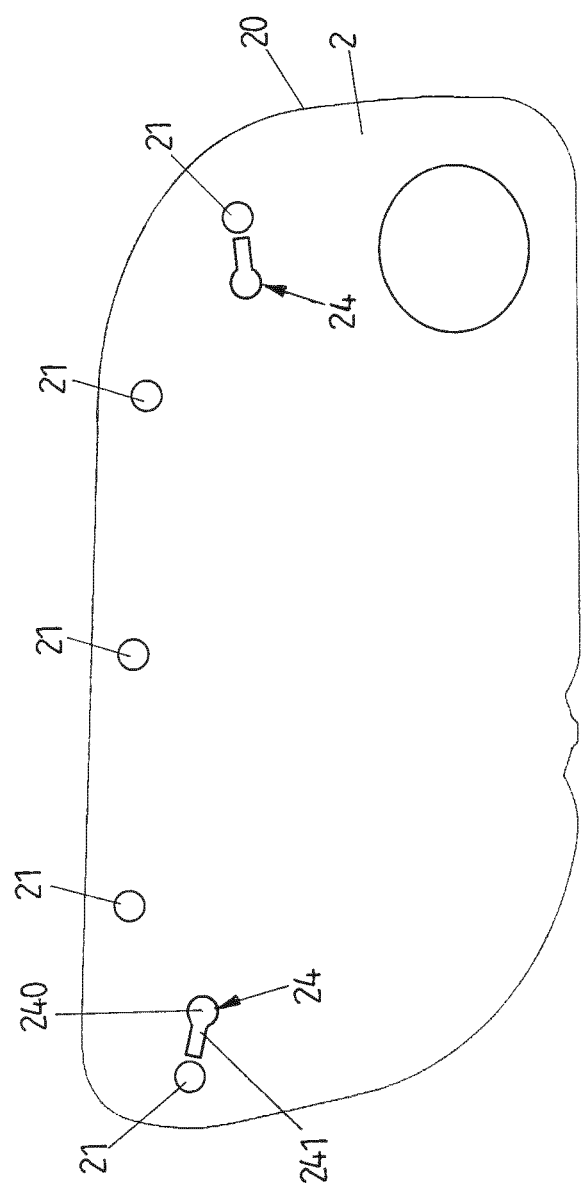
FIG. 4 shows a schematic representation of an organo-sheet for a door module or an assembly carrier of a motor vehicle door with preformed mounting receptacles for hot forming the organo-sheet.

A further measure to avoid tearing out of the suspension points of an organo-sheet and weakening of a structural component in the region of the suspension points or lack of dimensional stability of the structural component as a result of changed suspension points of the organo-sheet during its hot forming is schematically shown in FIG. 4 and consists of the arrangement of suspension points 24 formed as keyhole openings for needles for accommodating the organo-sheet with openings 240 for connection with the needles and a slot 241 pointing away from the openings 240 for specifying a defined yielding, sliding and deformation direction during molding of the organo-sheet, since the woven fabric, laying or knit fabric embedded into the plastic matrix is able to meet the elongation demand at the suspension points only incompletely.

The slots 241 preferably are aligned in direction of perforations 21 for connection of the structural component 5 manufactured from the organo-sheet 2 for example with a motor vehicle door. The suspension points 24 subsequently are closed by injecting a plastic material, so that the structural component formed from the organo-sheet 2 exclusively includes the perforations 21 which for example can be formed as interfaces for a bayonet connection.

To prepare the organo-sheet for the later use of the structural component manufactured from the organo-sheet, various measures can be taken, which serve both the later intended use and the increase in stability and loadability of the structural component. Examples for this are shown in FIGS. 5 to 39 described below.

Figure 5:
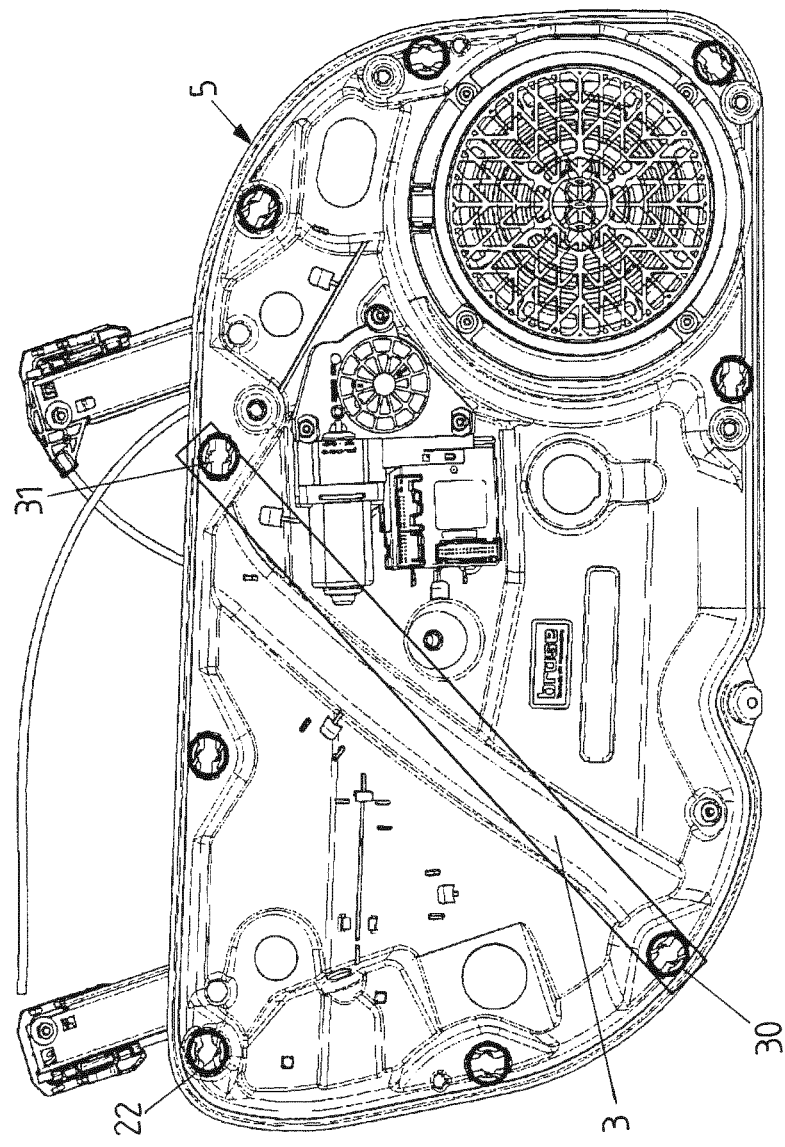
FIG. 5 shows a top view of a tie integrated into an organo-sheet for a door module and aligned with the loading direction.

FIG. 5 shows a top view of a structural component formed as door module or assembly carrier 5, in which before or during hot forming a tie 3 has been aligned diagonally with respect to the substantially rectangular basic structure of the door module 5 and has been connected with the organo-sheet 2 or door module 5 at connecting points 30, 31. Preferably, the connection of the tie 3 with the door module 5 is effected at interfaces or through openings 22 for a bayonet connection of the door module 5 with a door inner panel of a motor vehicle door. The connecting points 30, 31 are integrated into the door module 5 or the tie 3 is put onto the door module 5 after forming the organo-sheet 2 to the door module 5 and is connected with the same by welding, gluing, riveting or the like.

The alignment of the tie 3 follows the tensile forces exerted on the door module 5 when actuating for example a window lifter mounted on the door module 5 or follows closing forces exerted on the door module 5 by an interior door handle.

In FIGS. 6 to 12 various possibilities of the force transmission of a tie 3 to a door module 5 in the region of the connecting points of the tie 3 with the door module 5 are illustrated.

Figure 7:
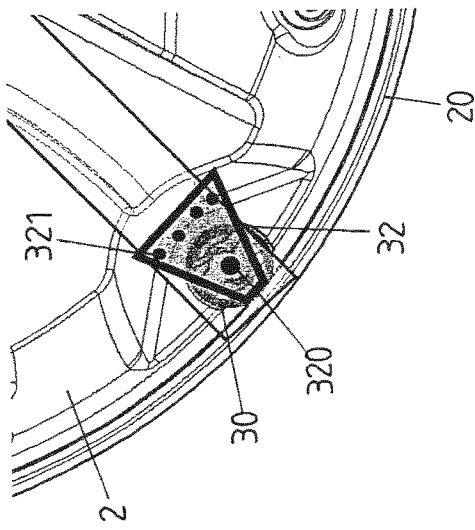
FIGS. 6 to 8 show a schematic representation of the edge region of an organo-sheet with an adapter for the force introduction and distribution of a tie integrated into the organo-sheet.
Figure 8:
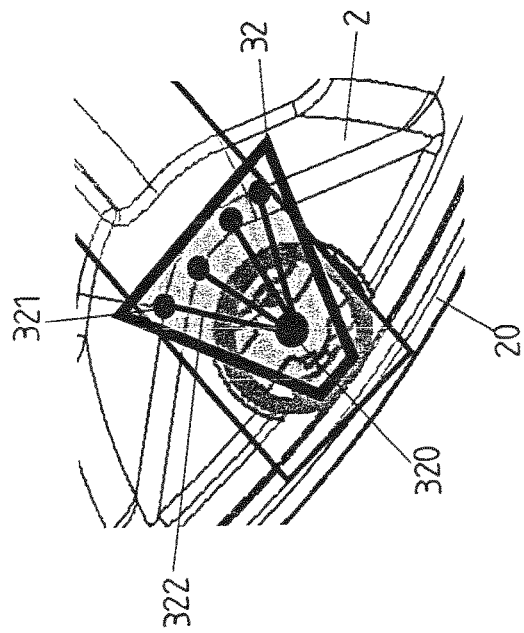
Figure 6:
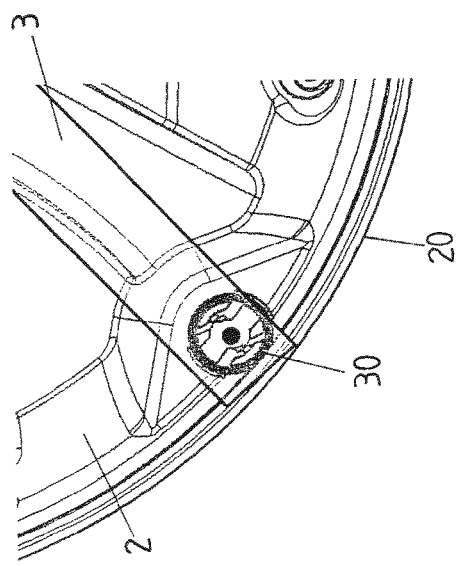
Figure 9:
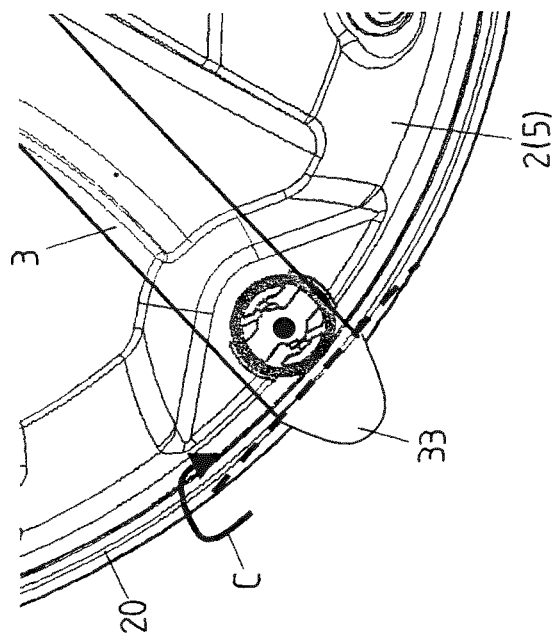
FIGS. 9 to 12 show a schematic representation of an edge region of an organo-sheet with reinforcing means for the connection of a tie with the organo-sheet.
Figure 11:
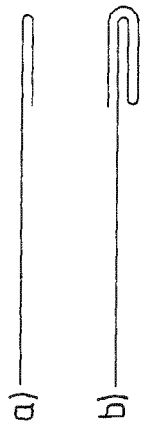

FIGS. 6 to 8 show sections of the edge region 20 of an organo-sheet 2 in a schematic top view, which show the connection of a tie 3 with the organo-sheet 2 at connecting points 30 which are provided as interfaces for a bayonet connection of the door module 5 manufactured from the organo-sheet 2 with a further structural component of a motor vehicle, for example with a door inner panel of a motor vehicle door.

For force transmission and force distribution of the tensile force exerted on the tie 3 and the structural component manufactured from the organo-sheet 2, adapters 32 are integrally molded to the ends of the tie 3 or the organo-sheet 2 or are crimped into the tie 3, glued or riveted to the tie 3. Alternatively, the adapters 32 and the tie 3 are put into a molding die for manufacturing the door module and injected. According to FIG. 7, the connection of the adapters 32 with the organo-sheet 2 is effected at a mounting point 320 with the organo-sheet 2 and via several mounting points 321 with the tie 3 arranged distributed at the triangular adapters 32.

For the further optimization of the force transmission between the tie 3 and the mounting point 30 of the tie 3 at the organo-sheet 2, fibers or fabrics 322 embedded into the adapters 32 can be provided according to FIG. 8, which connect the mounting point 320 at the organo-sheet 2 with the mounting points 321 distributed along the tie 3.

Figure 10:
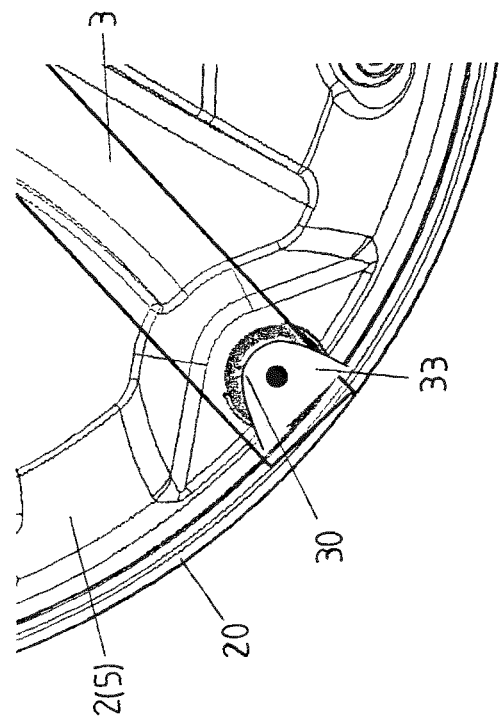

FIGS. 9 to 12 show a further alternative for the force transmission between a structural component manufactured from an organo-sheet 2 in the form of a door module 5 and a tie 3, which with its edge region 20 is connected with the organo-sheet 2 or door module 5. According to FIG. 9, this form of the force transmission consists of a protrusion 33 of the tie 3 protruding beyond the edge region 20 of the organo-sheet 2, which is folded over in direction of the arrow C according to FIG. 9 and in the position according to FIG. 10 is thermally fused to the mounting point 30 of the organo-sheet 2, for example by ultrasonic welding or the like. This results in a reinforcement of the connection of the tie 3 with the organo-sheet 2 by simple or multiple material doubling, as is schematically shown in FIGS. 11a and 11b.

Figure 12:
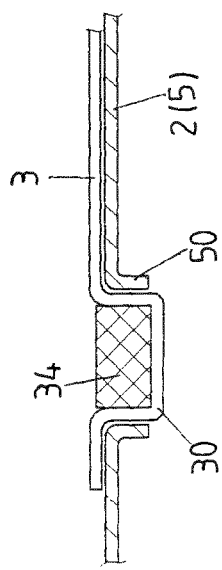

FIG. 12 shows a schematic longitudinal section of a supplementary measure for the optimum tensile force transmission between the tie 3 and the organo-sheet 2 for manufacturing the structural component formed for example as door module or assembly carrier 5 by inserting a stabilizing plug 34 into the tie 3, so that the same is pressed into the mounting point 30, which is formed as aperture 50 in the organo-sheet 2 or structural component 5, and thereby produces a positive connection of the tie 3 with the organo-sheet 2 or structural component 5.

An alternative configuration of adapters is shown in FIGS. 13-15 in a top view and two sections.

FIG. 13 shows a top view of an organo-sheet 2 with an integrally molded adapter 8 of a plastic matrix which proceeding from a mounting opening 65 for putting through a bolt, a screw or a rivet is fanned up and includes ribs 80 fanned up like fingers, in order to be able to connect more paths of force with the organo-sheet 2 by arrangement of long-fibered fiber rovings. The structure of the ribs 80 is illustrated in the top view of the organo-sheet 2 according to FIG. 13 and the longitudinal section shown in FIG. 14 along line A-A of FIG. 13 as an elevation with respect to the integrally molded planiform plastic matrix of the adapter 8 corresponding to the longitudinal section shown in FIG. 15 along line B-B of FIG. 13.

To produce the positive connection between the adapter 8 and the organo-sheet 2, a through-molding cavity is provided in the molding die on the side of the organo-sheet 2 opposite the injection molding side of the adapter 8, which can only be filled with the material of the plastic matrix of the adapter 8 by through-molding the reinforcing element or organo-sheet 2 in the region of the reinforcing element. The material of the adapter 8 is pressed through the structure of the organo-sheet at the points provided for this purpose, wherein the organo-sheet must have a temperature high enough for through-molding. It is, however, also possible to provide pre-perforations 9 in the region of the through-molding cavity of the organo-sheet 2, in order to produce the intended positive connection with the adapter 8.

FIG. 14 shows the through-molding region 800 on the side of the organo-sheet 2 opposite the plastic matrix of the adapter 8. The through-molding region 800 at the same time serves for process control, since the degree of filling represents a quality feature for the connection to be produced, in particular when the material of the adapter is directly injected through the structure of the organo-sheet (i.e. without pre-perforations 9). When the region 800 is formed completely, the connection can be regarded as proper, whereas an incomplete formation of the through-molding region 800 must be qualified as insufficient. This can be due to deviations from set parameters in the process management, e.g. too low a temperature of the organo-sheet.

Alternatively or in addition to an arrangement and connection of additional fastening means on an organo-sheet for manufacturing a structural component for a motor vehicle, there can be provided a corresponding structuring or configuration of the organo-sheet as semi-finished product for manufacturing a structural component for a motor vehicle. Examples for the manufacture of a door module 5 for a motor vehicle door from an organo-sheet 2 are shown in FIGS. 16 to 39 and will be explained in detail below.

Figure 17:
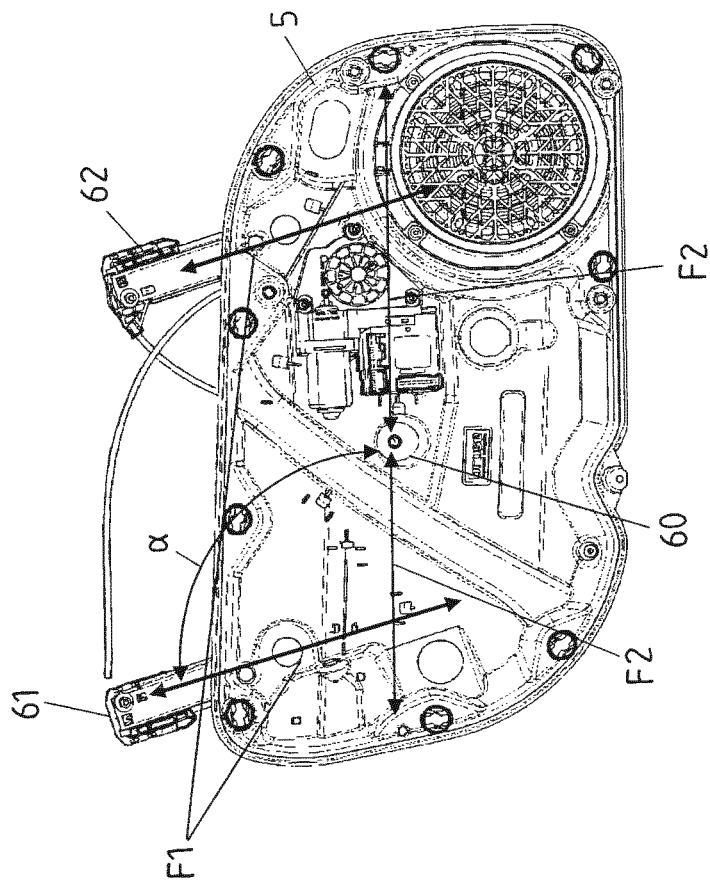
FIGS. 16 and 17 show a schematic representation of an organo-sheet for a door module or an assembly carrier with fiber flow oriented in various loading directions of the woven fabric or laying embedded into a thermoplastic matrix of the organo-sheet.
Figure 16:
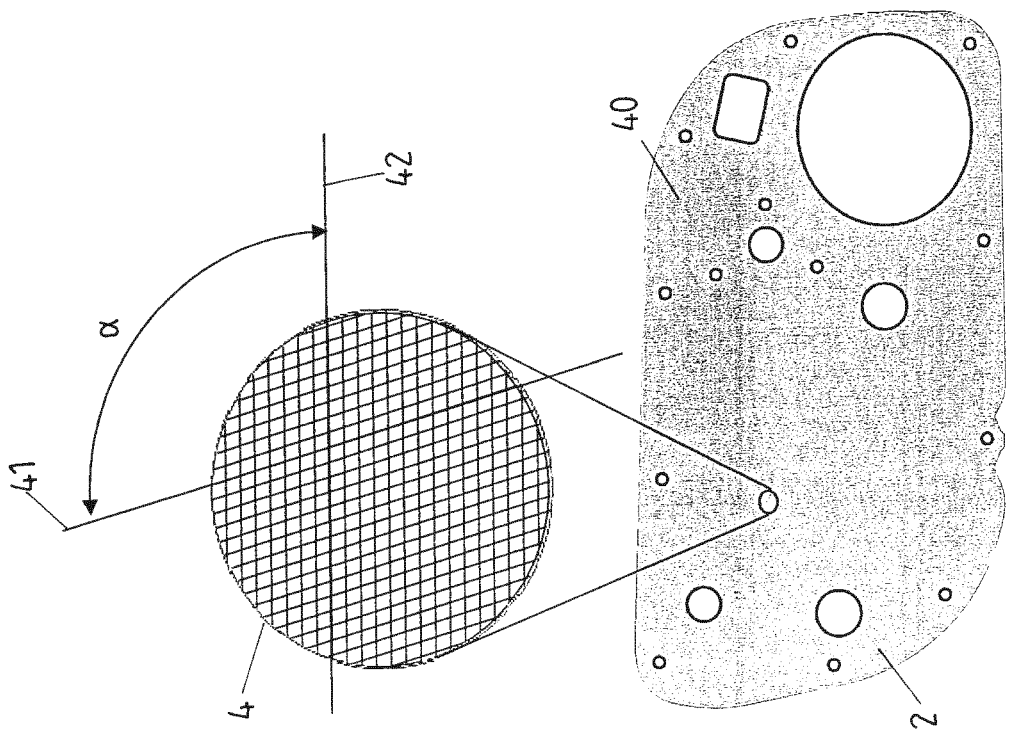

FIGS. 16 and 17 show an example for a targeted preparation of an organo-sheet 2 for the use of a structural component formed as door module 5, in which according to FIG. 16 the continuous fibers embedded in the plastic matrix 40 are aligned in direction of the forces acting on the door module 5.

FIG. 16 shows a schematic representation of a section of the woven fabric, knit fabric or laying 4 of intersecting continuous fibers 41, 42 which include an angle α of e.g. 100° between themselves. According to FIG. 17, this orientation on the one hand corresponds to the one of forces $F_1$ exerted on the door module 5 by a window lifter with guide rails 61, 62 and oriented parallel to the guide rails 61, 62 and on the other hand of forces $F_2$ oriented parallel to the upper and lower edge of the door module 5, which are directed from and to a connection 60 of a door closing handle to the door module 5. The main directions of force $F_1$ and $F_2$ to be found in the fiber flow of the woven fabric or laying or knit fabric 4 of the continuous fibers 41, 42 effect an optimum introduction of force into the door module 5, so that the structural strength of the door module 5 manufactured from an organo-sheet 2 corresponds to that of a structural component made of steel, wherein both the manufacture of the door module 5 from an organo-sheet is simplified and its weight is reduced substantially.

Possibilities for the shaping and composition of an organo-sheet for manufacturing a structural component in dependence on its field of use and loading are shown in FIGS. 18 to 21.

Depending on loading and field of use of the structural component
- different materials for the continuous fibers of the organo-sheet,
- different types of fabric,
- different forms of the fabric structure,
- a different number of layers of the plastic matrix and embedded continuous fibers,
- a different thickness of the individual layers, and
- a different fiber-matrix ratio are provided, in order to optimize the crash properties and the stiffness of the organo-sheet 2 as well as the drapability of the continuous fibers or the woven fabric, laying or knit fabric in the plastic matrix of the organo-sheet 2.

Figure 18:
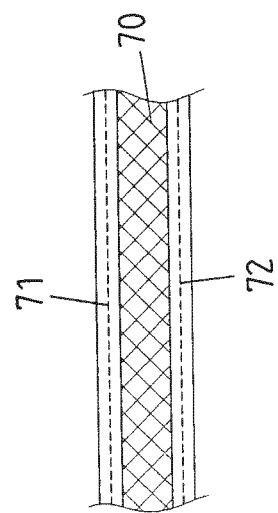

FIG. 18 shows a schematic cross-section through an organo-sheet with a core region 70 and edge regions 71, 72 which form a layer reinforced with carbon fibers to increase the stiffness and to protect the core region 70 against moisture. The core region 70 for example consists of an aramide layer for optimizing the fracture behavior and the crash safety and, if necessary, also can contain natural fibers such as wood or sisal.

Figure 19:
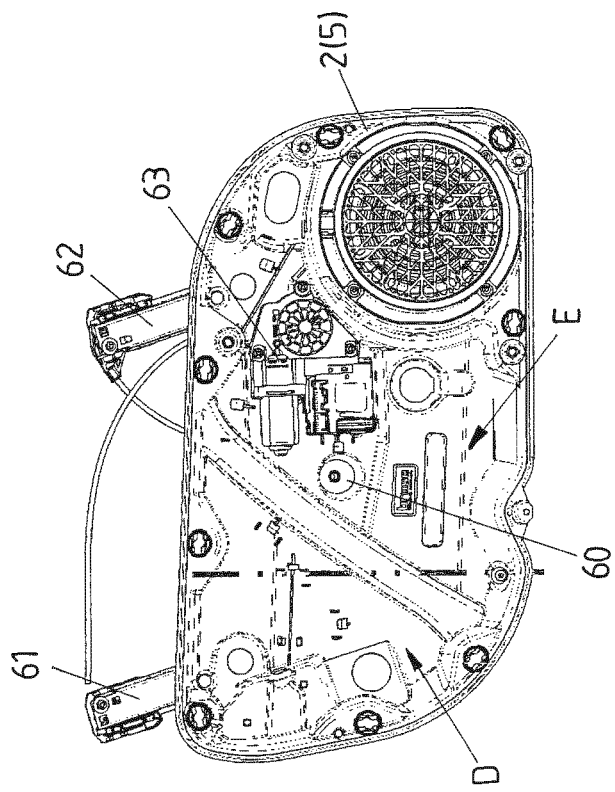
FIGS. 18 to 21 show various embodiments of fabric layers for embedding into a thermoplastic matrix for a door module or an assembly carrier of a motor vehicle door.
Figure 21:
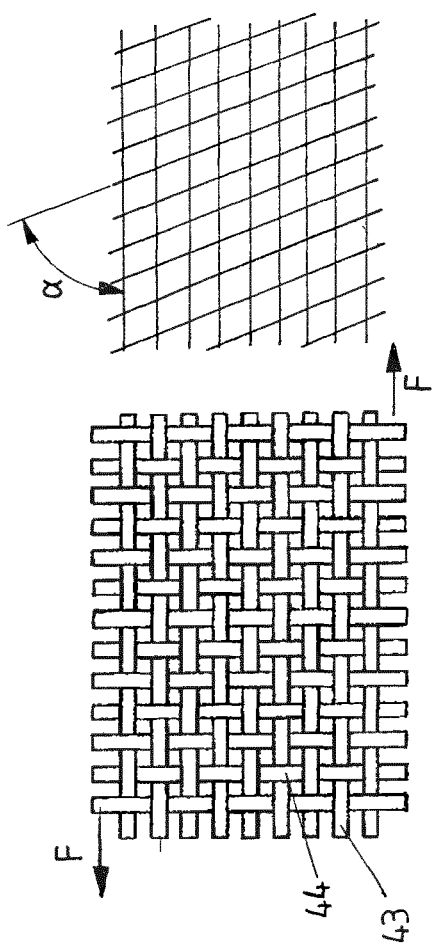
Figure 20:
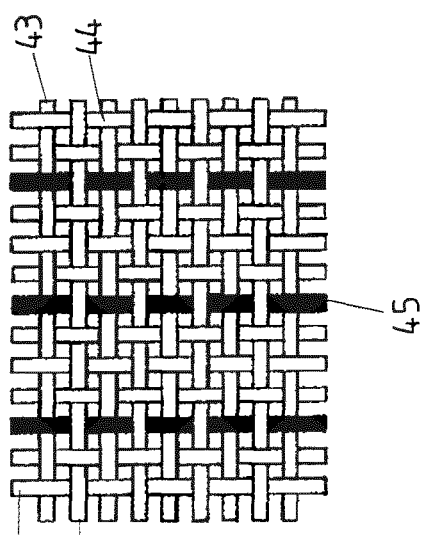

FIGS. 19 to 21 show an example for the individual adaptation of an organo-sheet 2 to the load of a structural component 5 manufactured from the organo-sheet 2 by hot forming.

In this exemplary embodiment, the structural component consists of a door module 5 with a window lifter mounted on the door module 5 with guide rails 61, 62 extending parallel to each other, a window lifter drive 63 and a mount 60 for a door closing handle. Since the structural component 5 must absorb both crash forces and the forces exerted by the assemblies mounted on the structural component 5, the organo-sheet 2 for manufacturing the structural component 5 is divided into two portions D and E which are adapted to the respective loads of the structural component 5.

In portion D a first type of fabric is embedded into the plastic matrix, which consists of two intersecting continuous fibers 43, 44, 45, wherein the continuous fibers 45 of the continuous fibers 44, 45 oriented in the same direction consist of another type of fabric than the two intersecting continuous fibers 43, 44.

In the second portion E the organo-sheet 2 consists of intersecting continuous fibers 43, 44 embedded into a plastic matrix, which by action of oppositely directed forces F are pulled into an orientation in which an angle α of e.g. 80° is produced between the two intersecting continuous fibers 43, 44.

The horizontal orientation of the continuous fibers 43 embedded into the plastic matrix in the region E of the organo-sheet 2 serves to absorb crash forces and to increase the basic stiffness, whereas the continuous fibers 44 intersecting with the continuous fibers 43 at an angle of e.g. 80° are adapted to the pull-off angle adapted by the orientation of the guide rails 61, 62 of the window lifter 6 to absorb adjustment forces of the window lifter 6. If necessary, a third layer of continuous fibers can be oriented at an angle of e.g. 20° to absorb closing forces which are exerted on the door module 5 by the connection of a door closing handle.

Figure 22:
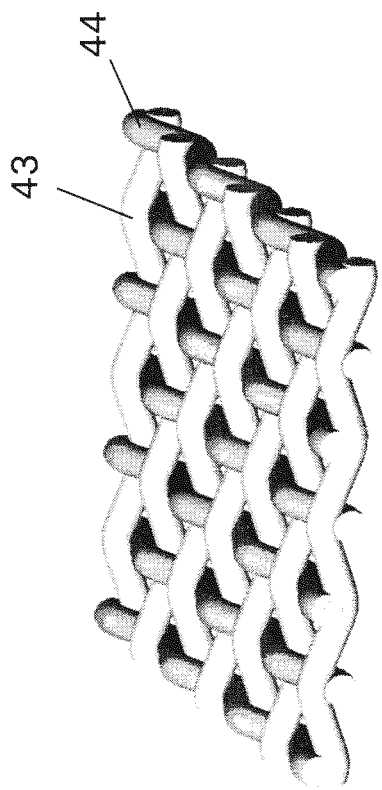
FIGS. 22 and 23 show perspective representations of two types of fabric for reinforcing the thermoplastic matrix of an organo-sheet.
Figure 23:
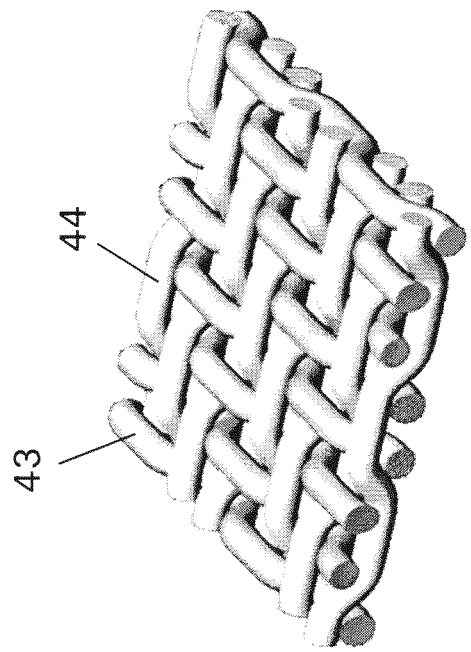

In FIGS. 22 and 23 various possibilities for the connection of identical or different continuous fibers 43 and 44 for manufacturing a woven fabric, knit fabric or laying to be embedded into a plastic matrix for example of aramide are shown in schematic, perspective representation.

Figure 24:
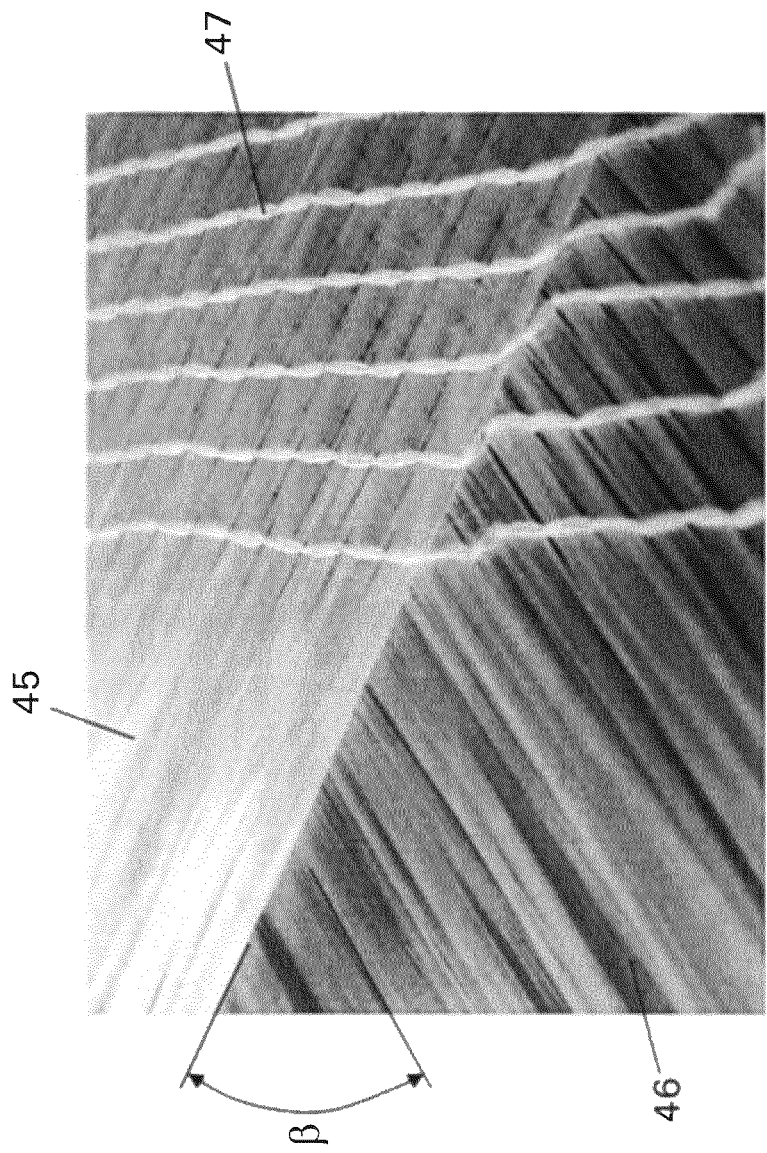
FIG. 24 shows a top view of a multiaxial laying with intersecting layers sewn together for reinforcing a thermoplastic matrix.

For defining the orientation of continuous fibers of a woven fabric, knit fabric or laying, FIG. 24 in a perspective representation shows the orientation of two continuous fibers 45, 46 intersecting at an angle 13, which are sewn together at the intersection points 47 to stabilize the layers of intersecting continuous fibers 45, 46.

Since organo-sheets with continuous fibers embedded into a plastic matrix, in contrast to pure plastic modules for manufacturing structural components for motor vehicles, have a distinctly smaller thickness, the problem of a reduced tightness arises for example for separating a wet space from a dry space by means of a door module 5 manufactured from an organo-sheet and incorporated into a motor vehicle door. In particular during hot forming of the organo-sheet, passageways can occur at points of greater deformation, through which moisture can pass from the wet space to the dry space of the motor vehicle door.

To prevent this, the structural measures schematically shown in FIGS. 25 to 28 can be taken, wherein FIG. 25 in a cross-section through an organo-sheet shows three layers 81 to 83 of a plastic matrix with embedded continuous fibers. With a corresponding deformation of this layered structure, corresponding breakthroughs can occur, which impair the function of the structural component.

Due to the arrangement of an additional film layer 84 between two layers of the organo-sheet, for example between the two layers 81 and 82 according to FIG. 26 or alternatively according to FIG. 27, due to the arrangement of a film layer 85 on a surface of the layered structure, or according to FIG. 28 with two film layers 86, 87 on both surfaces of the layered structure of the organo-sheet, the tightness of the organo-sheet is ensured. The additional layer 84, 85 or the additional layers 86, 87 can consist of a film, a fleece accommodating and entraining the plastic matrix during the forming process, or of a sealing protective paint.

The manufacture of a structural component from an organo-sheet creates the prerequisite for an optimum adaptation of the structural component to its mechanical or thermal load by a corresponding design of the organo-sheet both with regard to its sandwich-like structure and with regard to the individual zones of an e.g. planiform structural component such as a door module or assembly carrier. FIGS. 29 to 34 show various embodiments of a multi-zone sandwich structure of an organo-sheet for manufacturing a structural component used as door module or assembly carrier for a motor vehicle.

Figure 29:
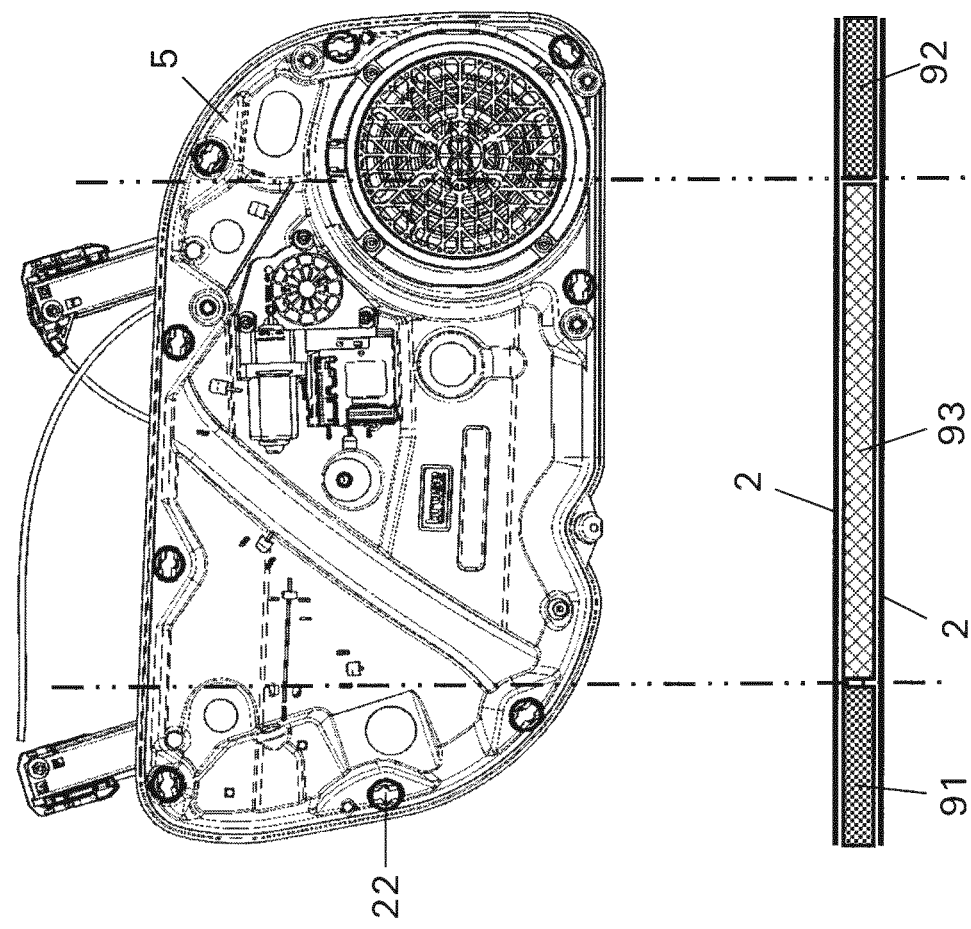
FIG. 29 shows a top view and a schematic cross-section through an organo-sheet in multi-zone sandwich construction.

In a top view and in a cross-section. FIG. 29 shows the formation of a door module 5 manufactured from a sandwich-like organo-sheet 2, which includes three zones 91, 92, 93 of which for example the middle zone 93 is formed with good thermal or sound insulation, but is not pressure-resistant, while the two outer zones 91, 92 have a high compressive strength for screwing the door module 5 to a door inner panel for absorbing the forces exerted by connecting elements at the through openings 22.

The sandwich structure of the organo-sheet 2 differs in the kind of the core material, the core thicknesses and the number of the different zones corresponding to the load acting on the structural component 5 manufactured from the organo-sheet 2. This ensures an optimum adaptation to requirements concerning the compressive strength or the insulation behavior of the structural component 5 manufactured from the organo-sheet 2, in order to optimize the crash properties, the stiffness and the drapability of the structural component 5.

The inlays integrated into the honeycomb structure of the multi-zone sandwich are adapted to the respective requirements in an optimized way and in particular fulfill the requirements of a minimum weight of the organo-sheet 2 and of the respective mechanical or thermal load by using plastic foams or a honeycomb structure material. Various examples for this are shown in FIGS. 30 to 34.

Figure 30:
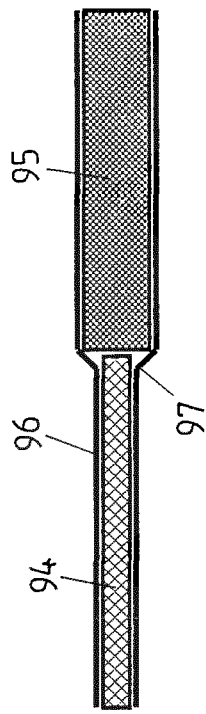
FIGS. 30 to 35 show various variants of the multi-zone sandwich construction according to FIG. 29.

FIG. 30 shows two core regions 94, 95 arranged one beside the other between outer layers 96, 97 with a thermally or acoustically well insulating region on the one hand and a region of high compressive strength for the absorption of the forces by a connecting element on the other hand.

Figure 31:
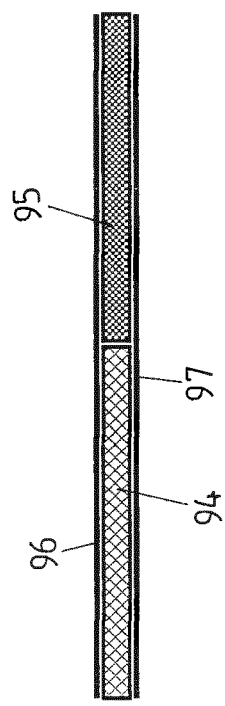

FIG. 31 shows the same arrangement as in FIG. 30 with a thickened region of a layer 95 with high compressive strength for a mounting region.

Figure 32:
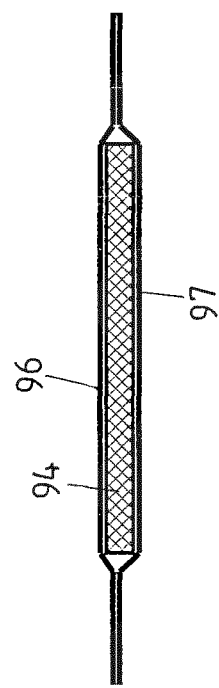

According to FIG. 32, a fixing region can be provided on both sides of a core region 94, which is formed by two outer layers 96, 97 lying one on top of the other, while the core region 94 contains a thermally or acoustically well insulating layer, depending on the requirement. The core region 94 also can be formed very narrow, for example when only a local support is necessary, as it is required for a door closing handle or as substitute for an embossment.

Figure 33:
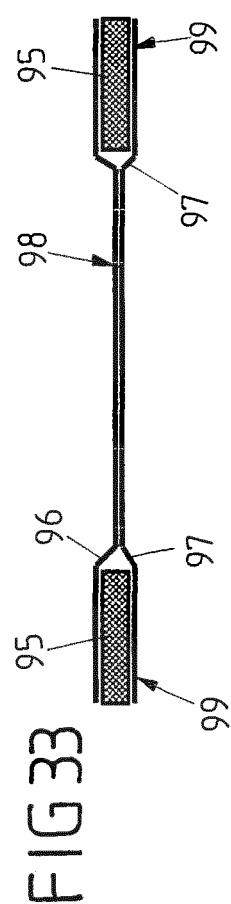

In a schematic cross-section. FIG. 33 shows the alternative formation in which a core region 98 consists of interconnected outer layers 95, 97 and edge regions 99 consist of a core region 95 with a layer for increasing the compressive strength and outer layers 96, 97 arranged on both sides of the core region 95. In this arrangement, the edge regions 99 have a high edge stiffness, in order to be able to well support sealing forces.

Figure 34:
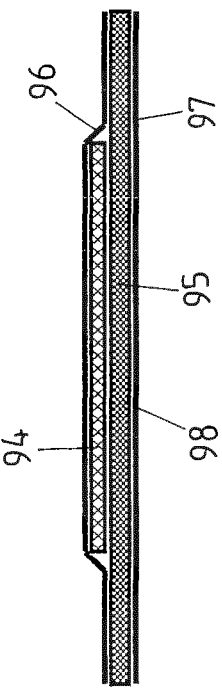

FIG. 34 shows a schematic cross-section through a variant with a continuous core region 98 of high stiffness 95 and a partial region 94 of high tensile strength and insulation capacity, whereby a compromise between various requirements with respect to stiffness, tensile strength and insulation capacity is created.

Figure 35:
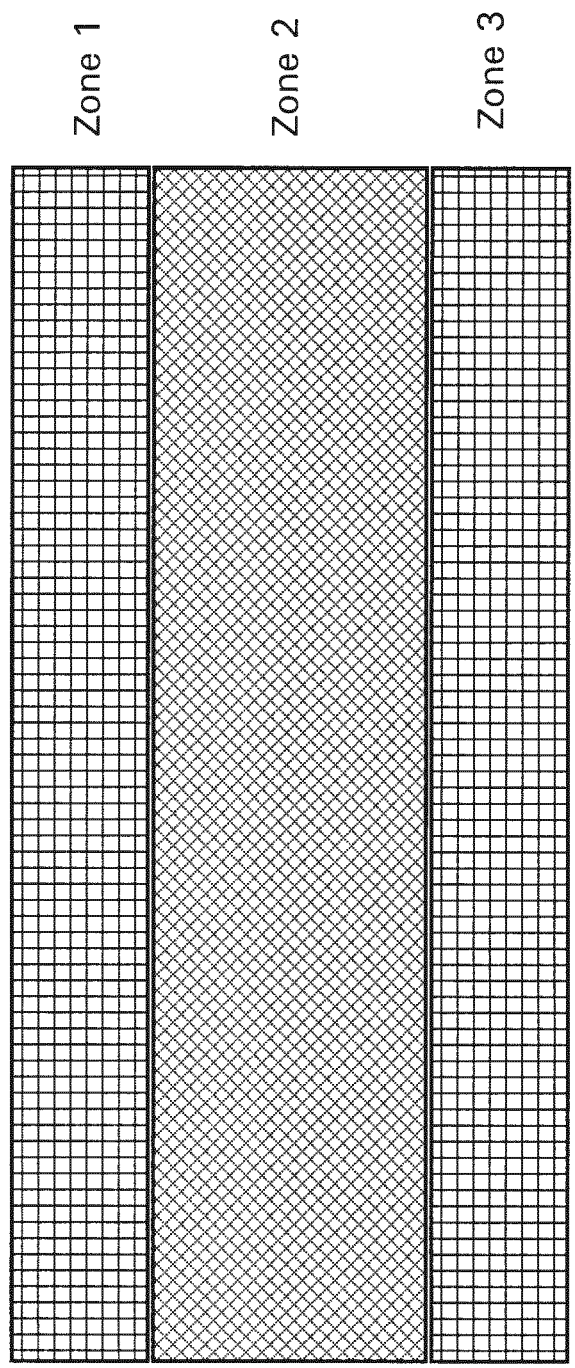

Beside a division of an organo-sheet for manufacturing a structural component for motor vehicles into zones or regions of the plate-shaped organo-sheet lying one beside the other, a cross-sectional layering of an organo-sheet into several zones can be provided. An example for this is represented in FIG. 35 and shows three zones which can have different material properties or material properties shared in pairs. For example, zone 2 can consist of a thermally or acoustically well insulating material, while the outer zones 1 and 3 are formed as zones of high compressive strength.

Figure 36:
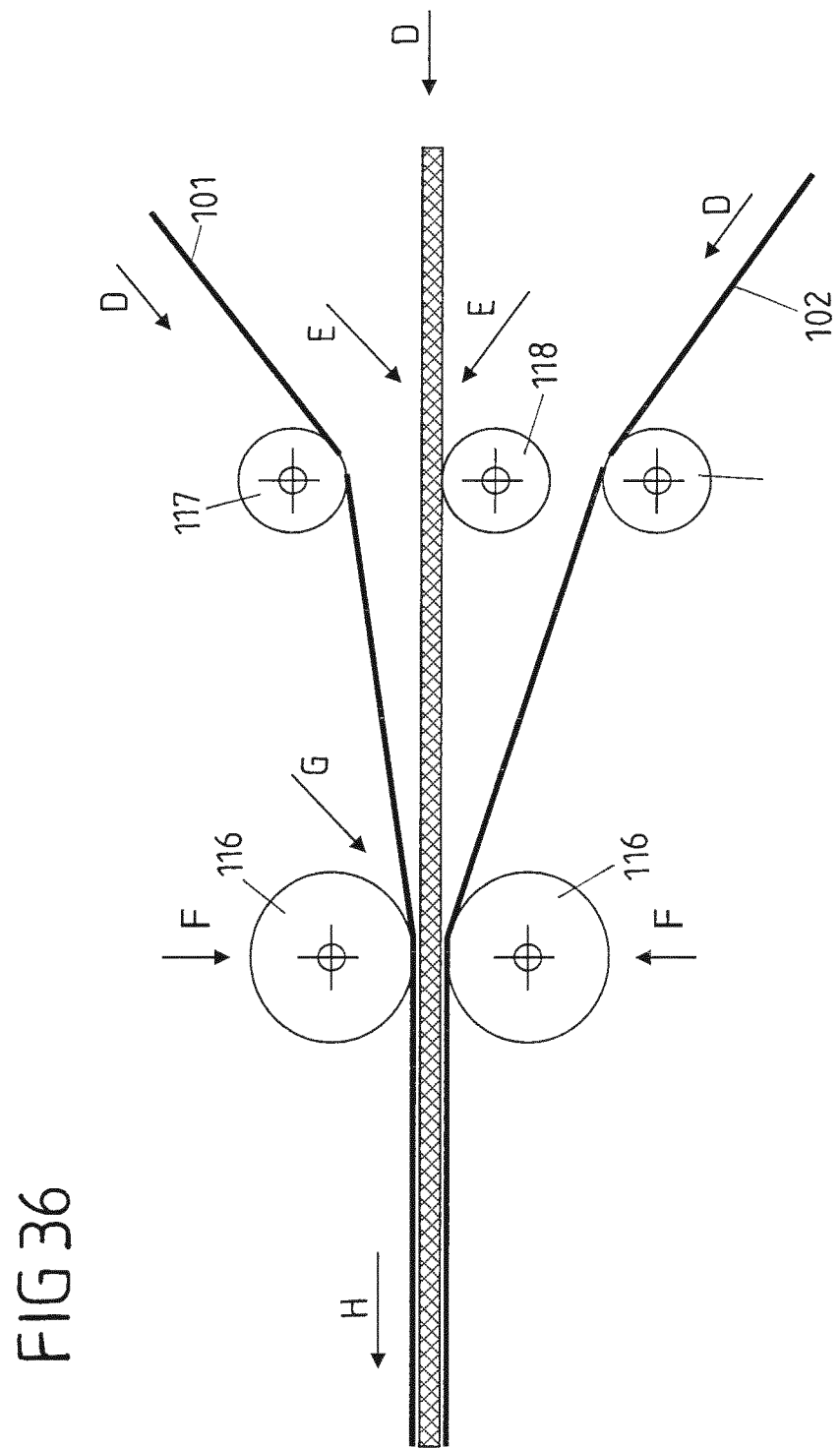
FIG. 36 shows a schematic representation of an apparatus for manufacturing an organo-sheet with multi-zone sandwich construction according to FIGS. 29 to 35.

The manufacture of an organo-sheet composed of different layers is schematically shown in FIG. 36 and includes three transport rollers 117, 118, 119 for supplying a core region 100 and two woven fabrics or layings 101, 102 covering the core region 100 in direction of the arrows D. Possibly by adding an adhesive or a plastic matrix E and/or by heat supply G, the woven fabrics or layings 101, 102 are connected with the core region 100 on rollers 116 with a force acting on the woven fabrics or layings 101, 102 and are output as organo-sheet in direction of the arrow H.

Further examples for the manufacture of organo-sheets with different zones are shown in FIGS. 37 to 39 with reference to a structural component formed as door module.

According to FIG. 37, the organo-sheet 2 includes three zones of which the middle zone I forms a region with high moment of resistance, so that a window lifter with corresponding pull-off forces, which is mounted on the structural component, does not lead to a deformation of the structural component manufactured from the organo-sheet 2.

FIG. 38 likewise shows a division of an organo-sheet 2 for manufacturing a door module as structural component 5 with a division into three longitudinally directed zones K. L. M, of which the middle zone K has a high tensile strength, so that tensile forces occurring on closing of a motor vehicle door are absorbed by the door module 5 without the same being deformed. The respectively upper and lower zone or the right and left zone L. M of the organo-sheet 2 for manufacturing a door module 5 as shown in FIG. 38 are characterized by a high compressive strength, so that the door module 5 attached to the door inner panel of a motor vehicle door has a high strength at the through openings or mounting points 22 of the door module 5 on the door inner panel.

FIG. 39 shows an orientation of three different zones N. 0, P on an organo-sheet 2 for manufacturing a door module 5 for a motor vehicle door, in which the middle zone N consists of a region with high moment of resistance, so that possibly a reinforcing web 35 provided at the structure of the organo-sheet 2 can be omitted. The high moment of resistance of the middle zone N is suited to also absorb the tensile forces exerted by a mounting point 60 for a door closing handle without producing a deformation of the door module 5 manufactured from the organo-sheet 2. The right and left zones O, P of the organo-sheet 2 for manufacturing a door module 5 in turn are characterized by a high pressure load bearing capability to achieve a high strength at mounting points 22 of the door module 5 on the door inner panel.

LIST OF REFERENCE NUMERALS

1 plant for hot forming organo-sheets
2 organo-sheet
3 tie
4 woven fabric, knit fabric or laying
5 structural component (door module or assembly carrier)
6 window lifter
8 reinforcing element (adapter)
9 pre-perforation
10 magazine
11 robot with gripper
12 processing unit
13 radiator unit (infrared radiator or radiant heater)
14 injection molding machine
15 extendable needle
16 mirror
17, 18 molding tools
20 outer edge or contour of the organo-sheet/structural component
21 perforations
22 interfaces or through openings (bayonet connections)
23 protrusions
24 suspension points (keyhole openings)
30, 31 connecting points
32 adapter
33 protrusion
34 stabilizing plug
40 plastic matrix
41, 42 continuous fibers
43-46 intersecting continuous fibers
47 intersection points
50 aperture
60 mount for a door closing handle
61, 62 guide rails
63 window lifter drive
65 mounting opening
70 core region
71, 72 edge regions
80 ribs fanned out like fingers
81-83 layers of a plastic matrix with embedded continuous fibers
84-87 films, fleece or sealing protective paint
91-93 zones of different properties
94, 95 core regions
96, 97 outer layers
98 core region
99 edge region
100 core region
101, 102 woven fabric or laying
116 rollers
117-119 transport rollers
240 openings
241 slots
320, 321 mounting points
322 fibers or woven fabrics
800 through-molding region
A directions of movement of the robot gripper
B directions of movement of the shiftable radiator unit
C folding direction
D covering direction
E adhesive or plastic matrix
F forces
G heat supply
H connecting force
I-P zones of different material properties

The invention claimed is:

1. A method for making an organo-sheet for manufacturing a structural component for a door inner skin, door module, or assembly carrier of a motor vehicle door separating a wet space from a dry space, the method comprising:
    preparing a compound of several layers forming a multilayer structure including outer layers of a plate-shaped semi-finished product of a thermoplastic plastic matrix;
    embedding continuous fibers or continuous fiber layers in the thermoplastic plastic matrix;
    orienting the continuous fibers or continuous fiber layers in a loading direction of a functional element of the door inner skin, door module, or assembly carrier of the motor vehicle door;
    arranging at least one sealing layer comprising a sealing protective film or a sealing protective paint between the outer layers of the thermoplastic plastic matrix for preventing passageways from being created through which moisture can pass from the wet space to the dry space of the motor vehicle door at points of greater deformation during a hot forming process of a comparatively strong spatial structure of the plate-shaped organo-sheet;

positioning at least two intersecting continuous fiber layers in the thermoplastic plastic matrix in angular positions to support several loading directions of the structural component; and fixing the at least two intersecting continuous fiber layers at their intersection points.

2. The method according to claim 1, further comprising orienting the continuous fibers or continuous fiber layers in a pull-off direction of a window pane of a window lifter when embedding the continuous fibers or continuous fiber layers in the thermoplastic plastic matrix.

3. The method according to claim 2, further comprising orienting the continuous fibers or continuous fiber layers in parallel to guide rails of the window lifter when embedding the continuous fibers or continuous fiber layers in the thermoplastic plastic matrix.

4. The method according to claim 1, further comprising orienting the continuous fibers or continuous fiber layers in a loading direction of a door closing handle when embedding the continuous fibers or continuous fiber layers in the thermoplastic plastic matrix.

5. The method according to claim 1, further comprising orienting the continuous fibers or continuous fiber layers in a direction of a pull connection between a door lock and a door hinge of the motor vehicle door when embedding the continuous fibers or continuous fiber layers in the thermoplastic plastic matrix.

6. The method according to claim 1, further comprising sewing the two intersecting continuous fiber layers at the intersection points.

7. The method according to claim 1, wherein the continuous fibers or continuous fiber layers are positioned in angular positions corresponding to the loading directions of the structural component, in order to achieve an optimum orientation, prior to embedding the continuous fibers or continuous fiber layers in the thermoplastic plastic matrix.

8. The method according to claim 1, further comprising integrating several layers of a thermoplastic plastic matrix with and without embedded continuous fibers into the organo-sheet.

9. The method according to claim 8, further comprising connecting the outer layers of the thermoplastic plastic matrix with an intermediate layer of aramide or a mixture of aramide with natural fibers, in particular of wood or sisal.

* * * * *